US010113366B2

(12) United States Patent
Duckworth

(10) Patent No.: US 10,113,366 B2
(45) Date of Patent: Oct. 30, 2018

(54) INTERGLAND GREASE

(71) Applicant: Halliburton Energy Services, Inc., Houston, TX (US)

(72) Inventor: David Patrick Duckworth, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 161 days.

(21) Appl. No.: 15/034,507

(22) PCT Filed: Dec. 11, 2013

(86) PCT No.: PCT/US2013/074360
§ 371 (c)(1),
(2) Date: May 4, 2016

(87) PCT Pub. No.: WO2015/088511
PCT Pub. Date: Jun. 18, 2015

(65) Prior Publication Data
US 2016/0290053 A1 Oct. 6, 2016

(51) Int. Cl.
*E21B 10/24* (2006.01)
*F16N 17/00* (2006.01)
*C10M 105/00* (2006.01)
*C10M 169/06* (2006.01)

(52) U.S. Cl.
CPC .............. *E21B 10/24* (2013.01); *C10M 5/00* (2013.01); *C10M 169/06* (2013.01); *F16N 17/00* (2013.01); *C10M 2205/026* (2013.01); *C10M 2205/0265* (2013.01); *C10M 2213/062* (2013.01); *C10M 2219/044* (2013.01); *C10M 2219/0445* (2013.01); *C10N 2220/082* (2013.01); *C10N 2230/00* (2013.01); *C10N 2230/06* (2013.01); *C10N 2230/36* (2013.01); *C10N 2240/00* (2013.01)

(58) Field of Classification Search
CPC .................................. E21B 10/08; E21B 10/24
See application file for complete search history.

(56) References Cited

U.S. PATENT DOCUMENTS

| 3,866,695 | A | 2/1975 | Jackson |
| 7,665,547 | B2 | 2/2010 | Yong et al. |
| 8,347,986 | B2 | 1/2013 | Anderele |
| 2011/0048809 | A1 | 3/2011 | Duckworth et al. |
| 2013/0153304 | A1 | 6/2013 | Crawford |

FOREIGN PATENT DOCUMENTS

WO  WO2012102771  *  8/2012  ............. E21B 10/24

OTHER PUBLICATIONS

International Search Report and Written Opinion, Application No. PCT/US2013/074360, 11 pages, dated Sep. 11, 2014.

* cited by examiner

*Primary Examiner* — D. Andrews
*Assistant Examiner* — Dany E Akakpo
(74) *Attorney, Agent, or Firm* — Baker Botts L.L.P.

(57) ABSTRACT

The present disclosure relates to an intergland grease formed from a base grease and a lubricating intergland grease additive, such as PTFE or a lubricating liquid polymer, such as polybutene. The present disclosure further relates to a roller cone drill bit including such an intergland grease.

18 Claims, 9 Drawing Sheets

INTERGLAND GREASE

RELATED APPLICATIONS

This application is a U.S. National Stage Application of International Application No. PCT/US2013/074360 filed Dec. 11, 2013, which designates the United States, and which is incorporated herein by reference in its entirety.

TECHNICAL FIELD

The present disclosure relates to a grease formulated for use in the intergland system of a roller cone drill bit, as well as to a roller cone drill bit containing such grease.

BACKGROUND

Roller cone drill bits are used to form wellbores in subterranean formations. Such drill bits generally include at least one support arm and often three support arms. A respective cone assembly may be rotatably mounted on interior portions of each support arm.

Each cone assembly often includes a base with a cavity or opening formed therein. Each cone cavity may be sized to receive exterior portions of an associated journal or spindle to allow rotation of the cone assembly relative to the associated journal or spindle while drilling a wellbore. A wide variety of bearings, bearing assemblies, bearing surfaces, seals and/or other supporting structures may be disposed between interior portions of each cone assembly and exterior portions of the associated journal or spindle.

Roller cone drill bits often include lubricant systems to supply lubricant to journals, bearings, bearing assemblies, bearing surfaces, seals and/or other supporting structures associated with rotation of each cone assembly mounted on a respective support arm. A variety of lubricants may be used with roller cone drill bits to accommodate rotation of each cone assembly relative to the respective spindle. A wide variety of seals and seal assemblies may be used to block communication between downhole well fluids and lubricants associated with rotation of each cone assembly. Various types of systems have been used to maintain lubricant system pressure to minimize potential damage to bearings, bearing assemblies, seals, journals and other supporting structures associated with rotation of a cone assembly relative to an associated support arm.

When a lubricant system includes an intergland system and a separate bearing lubrication system, although bearing greases commonly contain a number of additives, the intergland grease is typically additive-free.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION

Figure 1:
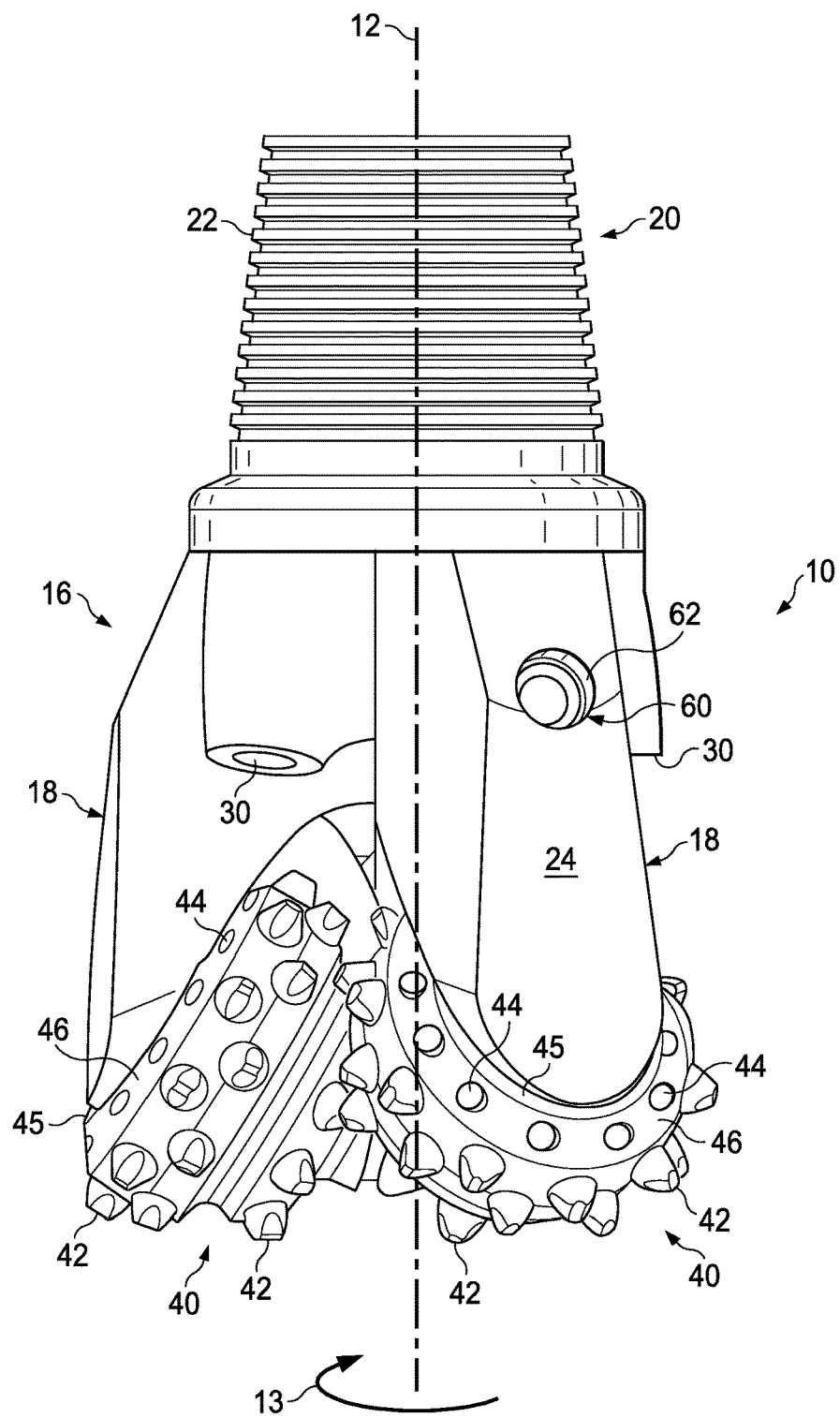
FIG. 1 illustrates a schematic drawing showing an isometric view of one example of a roller cone drill bit, in accordance with embodiments of the present disclosure.

The present disclosure relates to an intergland grease for use in the intergland system of a roller cone drill bit and to a drill bit containing such a grease. The intergland system may be used in a two-seal bit in order to provide pressure compensation and to lubricate the seal-metal interface. Due to its location within the bit, the intergland grease may not require or benefit from, and thus may not contain extreme pressure additives of the type found in bearing lubrication grease. For example, the intergland grease may lack molybdenum disulfide or other additives common in bearing lubrication grease that may be abrasive to seals.

The intergland grease may contain one or more additives that assist in lubricating the seal-metal interface. The additives may also be compatible with the material used to form the seal and may not cause swelling or hardening of this seal material. Additionally, these additives may be compatible with the bearing lubrication grease used in the same drill bit so that the one or both of the intergland grease and the bearing lubrication grease may still lubricate adequately to avoid damage to the bit during continued operation if the two greases become mixed.

The intergland grease additive may include polytetrafluoroethylene (PTFE). PTFE may be provided in the form of a powder, such as a pure powder. The powder may contain particles, which may have a size selected to optimize lubrication.

The intergland grease additive may also or alternatively include a lubricating liquid polymer, such as polybutene, particularly a high molecular weight and high viscosity polybutene, polyisobutylene, or a silicone-containing material. These polymers may have the same or a different molecular weight as similar polymers used in bearing lubrication grease. In one embodiment, the intergland grease may contain between 5 wt % and 15 wt % additive, such as 10 wt % or less additive or between 5 wt % and 15 wt % additive. The additive may be selected to be easily blended with the base grease, for example by simple mechanical mixing.

The base grease in which the additive is mixed to form the intergland grease may contain any base grease compatible with the seal material. In one embodiment, the base grease may include a metal soap grease, or alternatively include a metal complex grease. The base grease may also or alternatively include a calcium sulfonate grease, such as an overbased calcium sulfonate grease. The base grease may additionally or alternatively include a wholly or partially synthetic grease, such as a grease formed from thickened oil.

Although specific intergland greases are described herein, other suitable intergland greases formed from a base grease and additive as described above may be identified by placing the grease of interest in a rotary seal tester and testing the average time until seal failure or an average seal wear property with the grease of interest and an grease formed from the same base grease without the intergland grease additive. If the grease of interest results in a decrease in a seal wear or an increase in average time until seal failure, then the grease is a suitable intergland grease according to the present disclosure.

Some embodiments of the present disclosure and associated advantages may be understood by reference to FIGS. 1-9 wherein like numbers refer to same and like parts.

Various features of the present disclosure may be described with respect to roller cone drill bits, support arms, cone assemblies, pressure relief mechanisms, lubricant systems and/or associated components. Some examples are shown in FIGS. 1-9. However, teachings of the present disclosure may be used with a wide variety of roller cone drill bits and associated lubricant systems, including intergland systems and are not limited to the embodiments as shown in FIGS. 1-9.

FIG. 1 illustrates a schematic drawing showing an isometric view of one example of roller cone drill bit 10, in accordance with embodiments of the present disclosure. Drill bit 10 as shown in FIG. 1 may be referred to as a "roller cone drill bit," "rotary cone drill bit," "rotary rock bit," or "rock bit." Drill bit 10 may include various types of such bits. Roller cone drill bits may have at least one support arm with a respective cone assembly rotatably disposed thereon.

A drill string (not expressly shown) may be attached to and rotate drill bit 10 relative to bit rotational axis 12. Drill bit 10 may rotate as indicated by arrow 13. Cutting action associated with forming a wellbore in a downhole formation may occur as cone assemblies, indicated generally at 40, engage and roll around the bottom or downhole end of a borehole or wellbore (not shown) in response to rotation of drill bit 10.

Figures 2, 3:
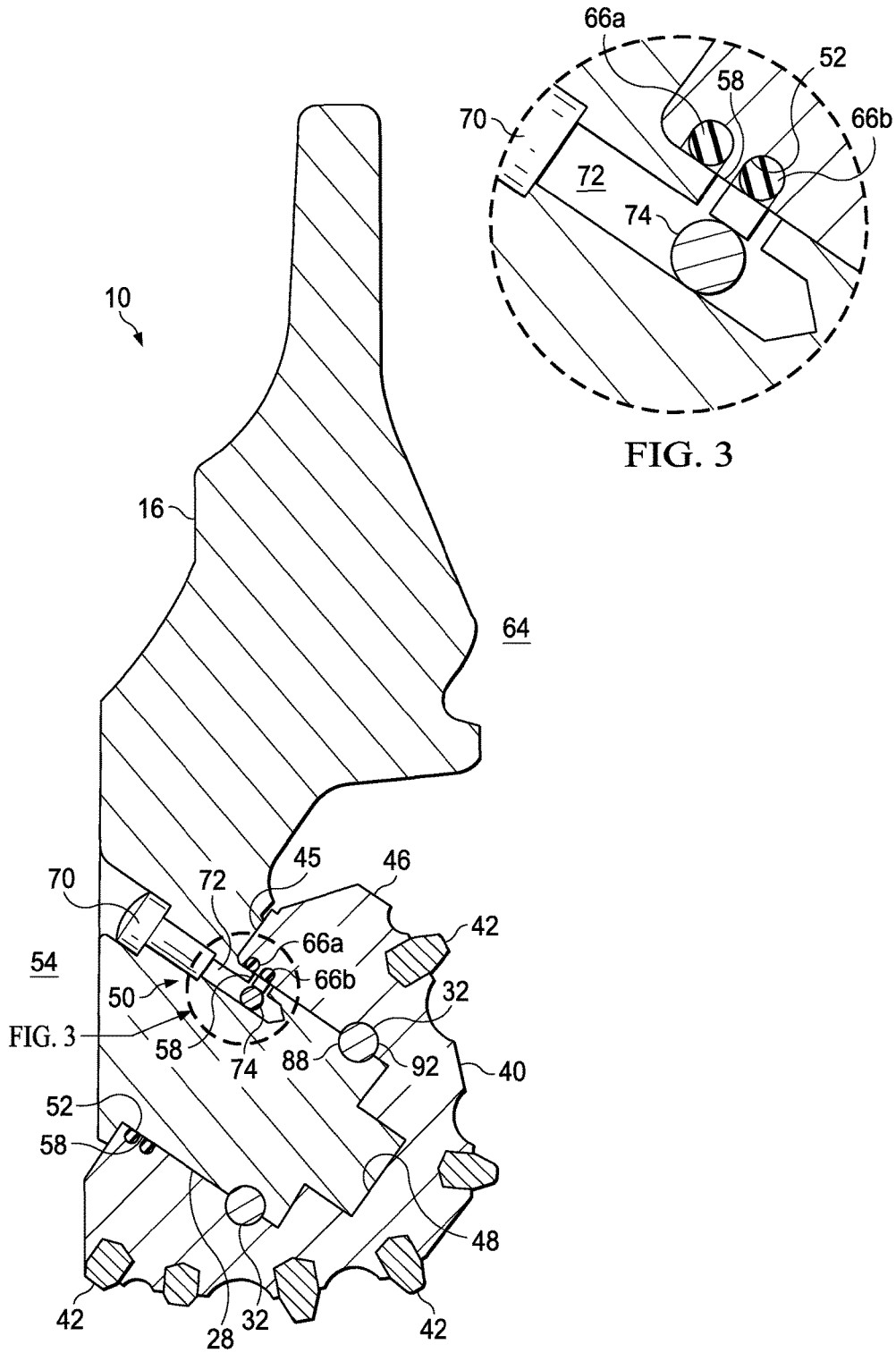
FIG. 2 illustrates a schematic drawing in section with portions broken away showing various components of a roller cone drill bit and an associated intergland lubrication system incorporating a floating bead and an intergland grease, in accordance with embodiments of the present disclosure.
FIG. 3 illustrates a schematic drawing of an enlarged view of a portion of the intergland system of the roller cone drill bit of FIG. 2.

Each cone assembly 40 may be attached with and rotate relative to exterior portions of associated spindle or journal 28, as shown in FIG. 2. Cone assembly 40 may be referred to as a "roller cone," "rotary cone cutter," "roller cone cutter," "rotary cutter assembly" and "cutter cone assembly." Each of cone assemblies 40 may include a plurality of cutting elements or inserts 42 which penetrate and scrape against adjacent portions of a downhole formation in response to rotation of drill bit 10. Referring to FIG. 1 and FIG. 2, cone assemblies 40 may also include a plurality of compacts 44 disposed on respective gauge surface 46 of each cone assembly 40. Cutting elements 42 may include various types of compacts, inserts, milled teeth and welded compacts satisfactory for use with roller cone drill bits. Cone assembly 40 may also include generally circular base portion 45.

For some embodiments of the present disclosure, drill bit 10 may include bit body 16 having three support arms 18 extending therefrom. Only two support arms 18 may be seen in FIG. 1, but the teachings of the present disclosure may be used in drill bits with various numbers of support arms 18. Uphole portion or pin end 20 of drill bit 10 may include generally tapered, external threads 22. Threads 22 may be used to releasably engage drill bit 10 with the downhole end of an associated drill string or bottomhole assembly (not expressly shown).

Formation materials and other downhole debris created during impact between cutting elements or inserts 42 and adjacent portions of a downhole formation may be carried from the bottom or end of an associated wellbore by drilling fluid flowing from nozzles 30. Such drilling fluid may be supplied to drill bit 10 by a drill string (not expressly shown) attached to threads 22. Drilling fluid with formation cuttings and other downhole debris may flow upwardly around exterior portions of drill bit 10 and through an annulus (not expressly shown) formed between exterior portions of drill bit 10 and exterior portions of an attached drill string and inside diameter or side wall of the wellbore to an associated well surface (not expressly shown).

Each support arm 18 may include a respective lubricant system 60. Lubricant may refer to any fluid, grease, composite grease, or mixture of fluids and solids satisfactory for lubricating journal bearings, thrust bearings, bearing surfaces, bearing assemblies and/or other supporting structures associated with rotatably mounting one or more cone assemblies on a roller cone drill bit. Lubricant system 60 may include external end or opening 62 adjacent to exterior portion 24 of associated support arm 18. Lubricant system 60 may further include intergland system 50.

FIG. 2 illustrates a schematic drawing in section with portions broken away showing various components of roller cone drill bit 10 and an associated intergland system incorporating floating bead 74, in accordance with embodiments of the present disclosure. Each cone assembly 40 may be rotatably mounted on associated spindle or journal 28 in a substantially similar manner. Accordingly, only one support arm 18, journal 28 and cone assembly 40 will be described in detail. Cone assembly 40 may include generally circular base portion 45 with cavity 48 extending inwardly therefrom. Cavity 48 (sometimes referred to as a "cone cavity") may have a generally cylindrical configuration sized to receive exterior portions of associated spindle or journal 28 therein. Associated gage surface 46 may extend radially outward and be tapered relative to respective base portion 45.

Each support arm 18 may include respective exterior surface 54 and interior surface 64 which are normally exposed to downhole well fluids while forming a wellbore. Each support arm 18 may include respective journal 28 formed as an integral component thereof. Respective cone assembly 40 may be rotatably mounted on each spindle or journal 28. Each spindle or journal 28 may be angled downwardly and inwardly with respect to bit rotational axis 12 of associated support arm 18 so that attached cone assembly 40 may engage the bottom or end of a wellbore (not expressly shown) during rotation of drill bit 10. For some applications, spindle or journal 28 may also be tilted at an angle of zero to three or four degrees in the direction of rotation of drill bit 10 shown by arrow 13, illustrated in FIG. 1.

A wide variety of supporting structures and/or bearing surfaces may be used to rotatably mount each cone assembly 40 on associated spindle or journal 28. For example, bearings or retaining balls 32 may be used between cone assembly 40 and spindle or journal 28 to secure cone assembly 40 on support arm 18. For some applications, bearings or retaining balls 32 may be described as a journal bearing. Bearings or retaining balls 32 may sometimes be described as a thrust bearing. For some applications, bearing surfaces associated with rotatably mounting a roller cone assembly on a spindle or journal may be formed as integral components (not expressly shown) disposed on exterior portions of an associated journal and interior portions of a cavity formed within an associated roller cone assembly. As shown in FIG. 2, retaining balls 32 may be disposed in an annular array (not expressly shown) within associated ball race 88 and ball race 92 formed in adjacent interior portions of cavity 48 of cone assembly 40. Once inserted, ball bearings 32 may prevent disengagement of cone assembly 40 from journal 28.

Referring to FIGS. 2 and 3, seals 66a and 66b may be used to prevent debris and well fluids from entering annular gap 58 formed radially between cone assembly 40 and journal 28. Seals 66a and 66b may be received in glands or grooves 52 formed in cone assembly 40. Seals 66a and 66b may be located in cavity 48 proximate an opening in base portion 45 of cone assembly 40. Seals 66a and 66b may be elastomeric seals and may form a fluid seal or fluid barrier between adjacent interior portions of cavity 48 and adjacent exterior portions of journal 28. Seals 66a and 66b may be operable to prevent downhole well fluids, formation cuttings, and/or downhole debris from entering cavity 48 and damaging associated bearing surfaces and supporting structures. Although two seals 66a and 66b are depicted in the drawings, any number of seals greater than two may be used in keeping with the scope of this disclosure. The terms "seal" or "fluid seal" may be used to refer to a wide variety of seals and seal assemblies including, but not limited to, an o-ring seal, t-seal, v-seal, flat seal, lip seal and any other seal or seal assembly operable to establish a fluid barrier between adjacent components or sealing surfaces.

As cone assembly 40 rotates about the journal 28, seals 66a and 66b may rotate with cone assembly 40 and seal against an outer surface of journal 28. However, in other embodiments of the present disclosure, seals 66a and 66b may remain stationary on the journal 28 (e.g., the seals being disposed in grooves formed on the journal), with cone assembly 40 rotating relative to journal 28 and seals 66a and 66b.

If damage occurs to journals, spindles, bearings, bearing assemblies, bearing surfaces, seals and/or other supporting structure associated with rotation of a roller cone or cone assembly relative to an associated support arm and/or lubrication systems to protect such components, the associated roller cone drill bit and attached drill string may generally be removed from the wellbore to replace damaged components and/or to replace the roller cone drill bit.

Filling an intergland lubrication system with intergland grease and maintaining desired lubrication in accordance with teachings of the present disclosure may increase downhole drilling life of a roller cone drill bit by maintaining desired lubrication related to seals, bearings, journals, bearing surfaces, bearing assemblies and/or other supporting structures associated with rotation of a roller cone assembly relative to the associated support arm.

In an intergland system, intergland grease may be supplied to bearings or retaining balls 32 from fluidly coupled lubricant chamber 70. Bead 74 may ensure that the lubricant is at substantially the same pressure as the downhole environment at exterior 54 of drill bit 10, when drill bit 10 is being used to drill a wellbore by moving within passage 72. Bead 74 may also allow the intergland grease to flow to annular gap 58 between seals 66a and 66b.

FIGS. 4-9 illustrate additional roller cone drill bits including an lubrication system containing a floating bead 158. An intergland grease as described herein may be used in the intergland lubrication system of these bits.

Figure 4:
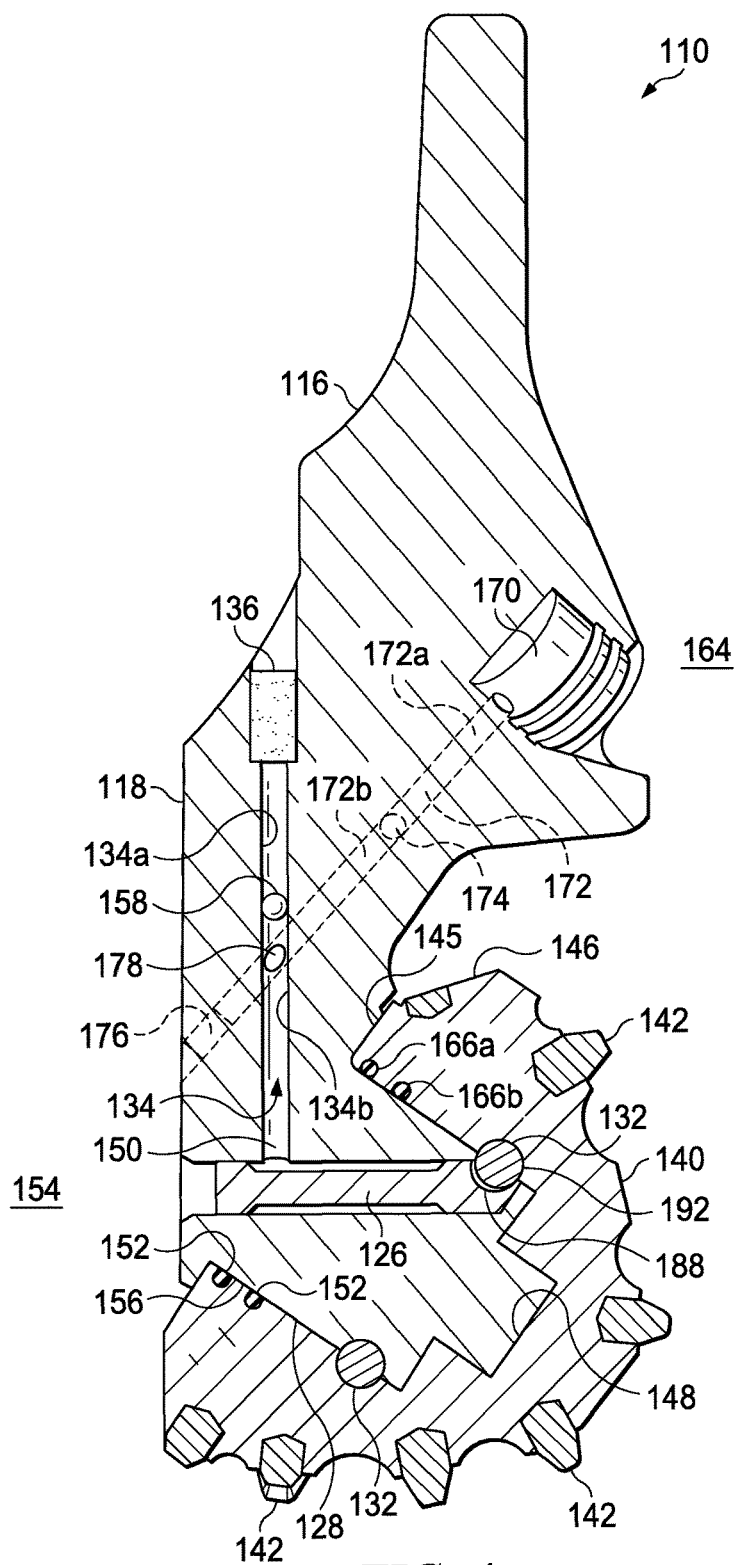
FIG. 4 illustrates a schematic drawing in section with portions broken away showing various components of a roller cone drill bit and an associated lubrication system incorporating a floating bead, in accordance with embodiments of the present disclosure.

FIG. 4 illustrates a schematic drawing in section with portions broken away showing various components of roller cone drill bit 110 and an associated lubrication system incorporating floating bead 174. Each cone assembly 140 may be rotatably mounted on associated spindle or journal 128 in a substantially similar manner. Accordingly, only one support arm 118, journal 128 and cone assembly 140 will be described in detail. Cone assembly 140 may include generally circular base portion 145 with cavity 148 extending inwardly therefrom. Cavity 148 (sometimes referred to as a "cone cavity") may have a generally cylindrical configuration sized to receive exterior portions of associated spindle or journal 128 therein. Associated gage surface 146 may extend radially outward and be tapered relative to respective base portion 145.

Each support arm 118 may include respective exterior surface 154 and interior surface 164 which are normally exposed to downhole well fluids while forming a wellbore. Each support arm 118 may include respective journal 128 formed as an integral component thereof. Respective cone assembly 140 may be rotatably mounted on each spindle or journal 128. Each spindle or journal 128 may be angled downwardly and inwardly with respect to bit rotational axis 112 of associated support arm 118 so that attached cone assembly 140 may engage the bottom or end of a wellbore (not expressly shown) during rotation of drill bit 110. For some applications, spindle or journal 128 may also be tilted at an angle of zero to three or four degrees in the direction of rotation of drill bit 110.

A wide variety of supporting structures or bearing surfaces may be used to rotatably mount each cone assembly 140 on associated spindle or journal 128. For example, bearings or retaining balls 132 may be used between cone assembly 140 and spindle or journal 128 to secure cone assembly 140 on support arm 118. For some applications, bearings or retaining balls 132 may be described as a journal bearing. Bearings or retaining balls 132 may sometimes be described as a thrust bearing. For some applications, bearing surfaces associated with rotatably mounting a roller cone assembly on a spindle or journal may be formed as integral components (not expressly shown) disposed on exterior portions of an associated journal and interior portions of a cavity formed within an associated roller cone assembly. As shown in FIG. 4, retaining balls 132 may be disposed in an annular array (not expressly shown) within associated ball race 188 formed in ball plug 126 and ball race 192 formed in adjacent interior portions of cavity 148 of cone assembly 140. Once inserted, ball bearings 132 may prevent disengagement of cone assembly 140 from journal 128.

Referring to FIG. 4, seals 166a and 166b may be used to prevent debris and well fluids from entering annular gap 156 formed radially between cone assembly 140 and journal 128. Seals 166a and 166b may be received in glands or grooves 152 formed in cone assembly 140. Seals 166a and 166b may be located in cavity 148 proximate an opening in base portion 145 of cone assembly 140. Seals 166a and 166b may be elastomeric seals and may form a fluid seal or fluid barrier between adjacent interior portions of cavity 148 and adjacent exterior portions of journal 128. Seals 166a and 166b may be operable to prevent downhole well fluids, formation cuttings, and/or downhole debris from entering cavity 148 and damaging associated bearing surfaces and supporting structures. Although two seals 166a and 166b are depicted in the drawings, any number of seals (including one) may be used in keeping with the scope of this disclosure. The terms "seal" or "fluid seal" may be used to refer to a wide variety of seals and seal assemblies including, but not limited to, an o-ring seal, t-seal, v-seal, flat seal, lip seal and any other seal or seal assembly operable to establish a fluid barrier between adjacent components or sealing surfaces.

As cone assembly 140 rotates about the journal 128, seals 166a and 166b may rotate with cone assembly 140 and seal against an outer surface of journal 128. However, in other embodiments of the present disclosure, seals 166a and 166b may remain stationary on the journal 128 (e.g., the seals being disposed in grooves formed on the journal), with cone assembly 140 rotating relative to journal 128 and seals 166a and 166b.

If damage occurs to journals, spindles, bearings, bearing assemblies, bearing surfaces, seals or other supporting structure associated with rotation of a roller cone or cone assembly relative to an associated support arm or lubrication systems to protect such components, the associated roller cone drill bit and attached drill string may generally be removed from the wellbore to replace damaged components and/or to replace the roller cone drill bit.

Filling an lubrication system with and intergland grease and maintaining desired lubrication in accordance with teachings of the present disclosure may increase downhole drilling life of a roller cone drill bit by maintaining desired lubrication related to seals, bearings, journals, bearing surfaces, bearing assemblies and/or other supporting structures associated with rotation of a roller cone assembly relative to the associated support arm.

In an lubrication system, intergland grease may be supplied to bearings or retaining balls 132 from fluidly coupled lubricant chamber 150. Lubricant chamber 150 may be sealed by ball plug 126. Retainer/filter 136 may prevent floating bead 158 from being discharged out of bore 134, and may filter well fluid which enters bore 134. Floating bead 158 may ensure that the intergland grease is at substantially the same pressure as the downhole environment at exterior 154 of drill bit 110, when drill bit 110 is being used to drill a wellbore.

Floating bead 158 may be spherically-shaped (e.g. a full sphere), such that it can rotate without binding within bores 134 while maintaining a sealing engagement with the bore. However, in other embodiments, a circumferential portion which contacts bore 134 may be flattened somewhat or floating bead 158 may have other shapes, such as cylindrical, barrel-shaped, etc. Any shape may be used for floating bead 158 and 174 in keeping with the scope of this disclosure. In another embodiment, floating bead 158 may be made entirely or at least exteriorly of an elastomer or other resilient material, which will deform somewhat when it sealingly contacts bore 134.

Floating bead 158 may define an exterior section 134a of bore 134 and an interior section 134b of bore 134. Accordingly, the precise location of sections 134a and 134b may change as floating bead 158 moves within bore 134. Interior section 134b of bore 134 may be included as part of the lubricant chamber 150. The sections 134a and 134b of bore 134 may be isolated from fluid communication with each other by the floating bead 158. Pressure across floating bead 158 may become substantially equalized between sections 134a and 134b. With pressure substantially equalized between sections 134a and 134b of bore 134 it may be appreciated that a pressure across seals 166a and 166b may also be substantially zero because seals 166a and 166b may be exposed to the intergland grease on one side, and may be exposed to exterior 154 of drill bit 110 on an opposite side.

Drill bit 110 may also contain a primary pressure compensation system that includes lubricant reservoir 170. In prior drill bits, the primary pressure compensation system is arranged such that lubricant is relieved from lubricant reservoir 170 and connected components to the external environment of drill bit 110. As a result, lubricant is lost to the bit during the course of operation of the primary pressure compensation system. In contrast, in drill bits of the present disclosure, the relieved lubricant is instead diverted to the intergland lubrication system. Accordingly, the lubricant in lubricant reservoir 170 may be an intergland grease according to the present disclosure.

In FIG. 4, bore 172 may provide fluid communication between lubricant reservoir 170 and lubricant chamber 150 through opening 178. Bore 172 may contain floating bead 174. Floating bead 174 may be made in the same variety of materials and in the same variety of shapes as floating bead 158. However, within a given drill bit 110, floating beads 158 and 174 may be made of different materials and have different shapes. Bore 172 may also contain plug 176 which may prevent passage of floating bead 174 and which may optionally also seal the end of bore 172.

Bore 172 may be configured on a different plane and at varied angles from bore 134. For example, as shown by the dotted lines in FIG. 4, bore 172 may be located under or to the left of bore 134. However, bore 172 and bore 134 may be close enough such that opening 178 is formed at the intersection of bore 172 and bore 134. Opening 178 may be sized such that neither floating bead 158, nor floating bead 174 may pass through opening 178, so that each floating bead remains in the appropriate bore. Opening 178 and floating bead 158 and 174 may also be configured and constituted so that the floating beads do not become irretrievably lodged in opening 178.

In operation, pressure may increase in lubricant reservoir 170 and may force floating bead 174 in the direction of plug 176. As floating bead 174 passes over opening 178, the pressurized intergland grease may enter bore 134. Friction between floating bead 174 and a wall of bore 172 may cause some variation in pressure between the upper section 172a and lower section 172b of bore 172, but floating bead 174 may displace in bore 172 to relieve all most pressure differentials across floating bead 174. The sections 172a and 172b of bore 172 may be isolated from fluid communication with each other by the floating bead 174.

Figure 5:
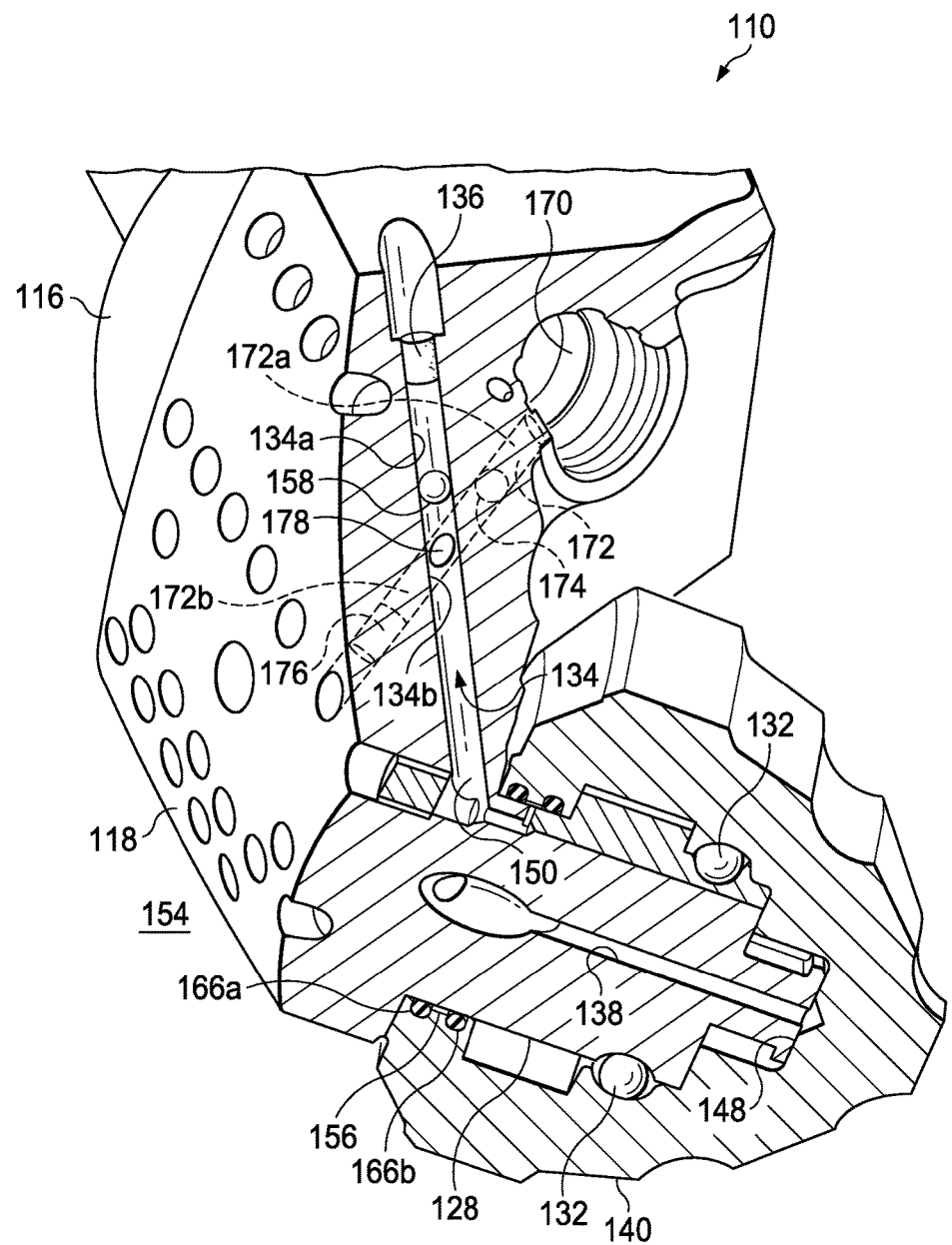
FIG. 5 illustrates a schematic drawing showing an isometric view of a drill bit with portions broken away showing an associated lubrication system incorporating a floating bead, in accordance with embodiments of the present disclosure.

FIG. 5 illustrates a schematic drawing showing an isometric view of drill bit 110 with portions broken away showing an associated lubrication system incorporating an opening 178 connecting lubricant reservoir 170 with lubricant chamber 150. FIG. 5 illustrates an alternative embodiment of the general system of FIG. 4 in which retaining balls 132 are housed in a different configuration and additional lubrication features are shown. In the embodiment of FIG. 5, lubricant chamber 150 is connected to passage 138, which extends to a lower end of the journal 128 for enhanced supply of intergland grease to the interface between the journal 128 and the cone assembly 140.

Figure 6:
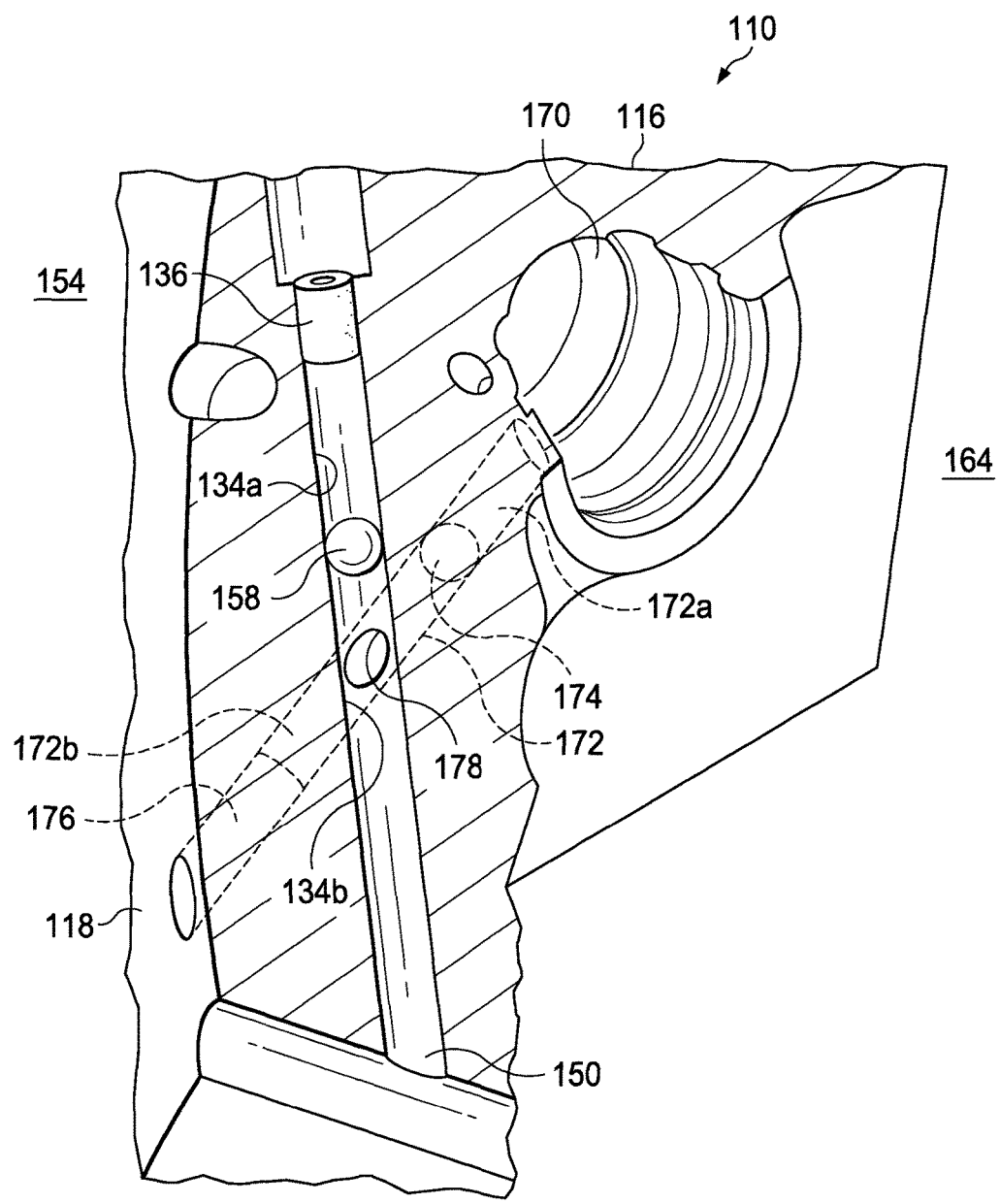
FIG. 6 illustrates a schematic drawing showing an isometric view of a drill bit with portions broken away showing an expanded view of an intersection, in accordance with embodiments of the present disclosure.

FIG. 6 illustrates a schematic drawing showing an isometric view of drill bit 110 according to the general embodiments shown in FIGS. 4 and 5 with portions broken away showing an expanded view of intersection 178. Intersection 178 may be the point at which bore 134 and bore 172 intersect. Although shown as an ellipse, intersection 178 may be an opening of any shape, such as, square, rectangular, circular, and/or any other suitable shape. Intersection 178 may be sized such that floating beads 158 and 174 may not pass through or become irretrievably lodged (e.g. lodged in such a manner that they may not be dislodged even by pressure differences) in intersection 178. For example, floating beads 158 and 174 may be larger than intersection 178 or floating beads 158 and 174 may be shaped in order to restrict floating bead 158 and 174 from entering bore 134 via intersection 178.

In certain embodiments of the present disclosure, intersection 178 may be located such that there may be a clearance between plug 176 and intersection 178. In other embodiments, there may not be clearance between plug 176 and intersection 178 such that floating bead 174 may not completely pass intersection 178 before contacting plug 176.

Figure 7:
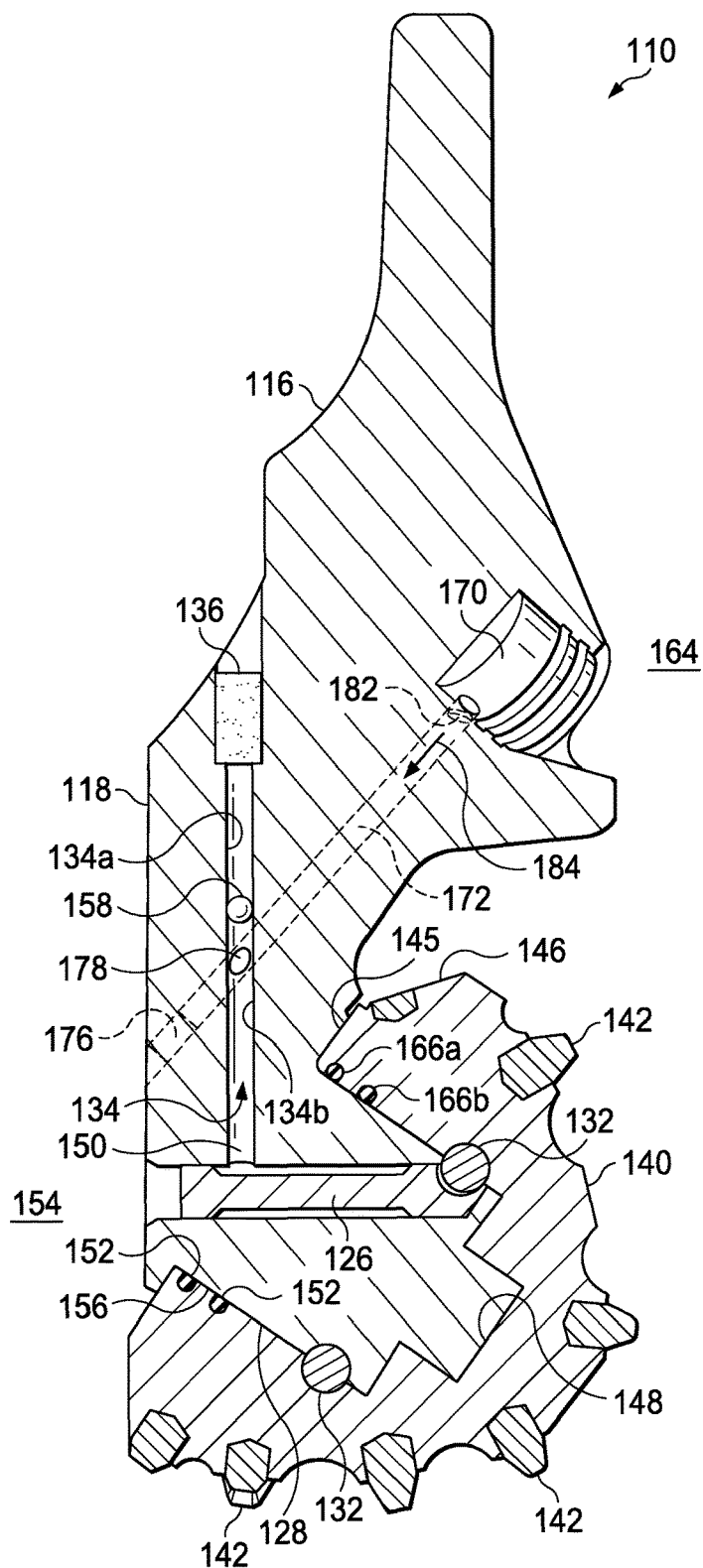
FIG. 7 illustrates a schematic drawing in section with portions broken away showing various components of a roller cone drill bit and an associated lubrication system incorporating a check valve, in accordance with embodiments of the present disclosure.

FIG. 7 illustrates a schematic drawing in section with portions broken away showing various components of roller cone drill bit 110 and an associated intergland lubrication system incorporating check valve 182. In the present embodiment, check valve 182 may be coupled to bore 172. Check valve 182 may allow intergland grease to flow from lubricant reservoir 170 into bore 172 in a direction shown by intergland grease flow arrow 184. However, check valve 182 may be configured to restrict intergland grease flow from bore 172 into reservoir 170. Check valve 182 may be located at any point in bore 172 between lubricant reservoir 170 and opening 178. Use of check valve 182 may preclude or render unnecessary the use of floating bead 174 shown in FIGS. 4-6. Check valve 182 may be any appropriate size to allow full function of check valve within bore 172.

Figure 8:
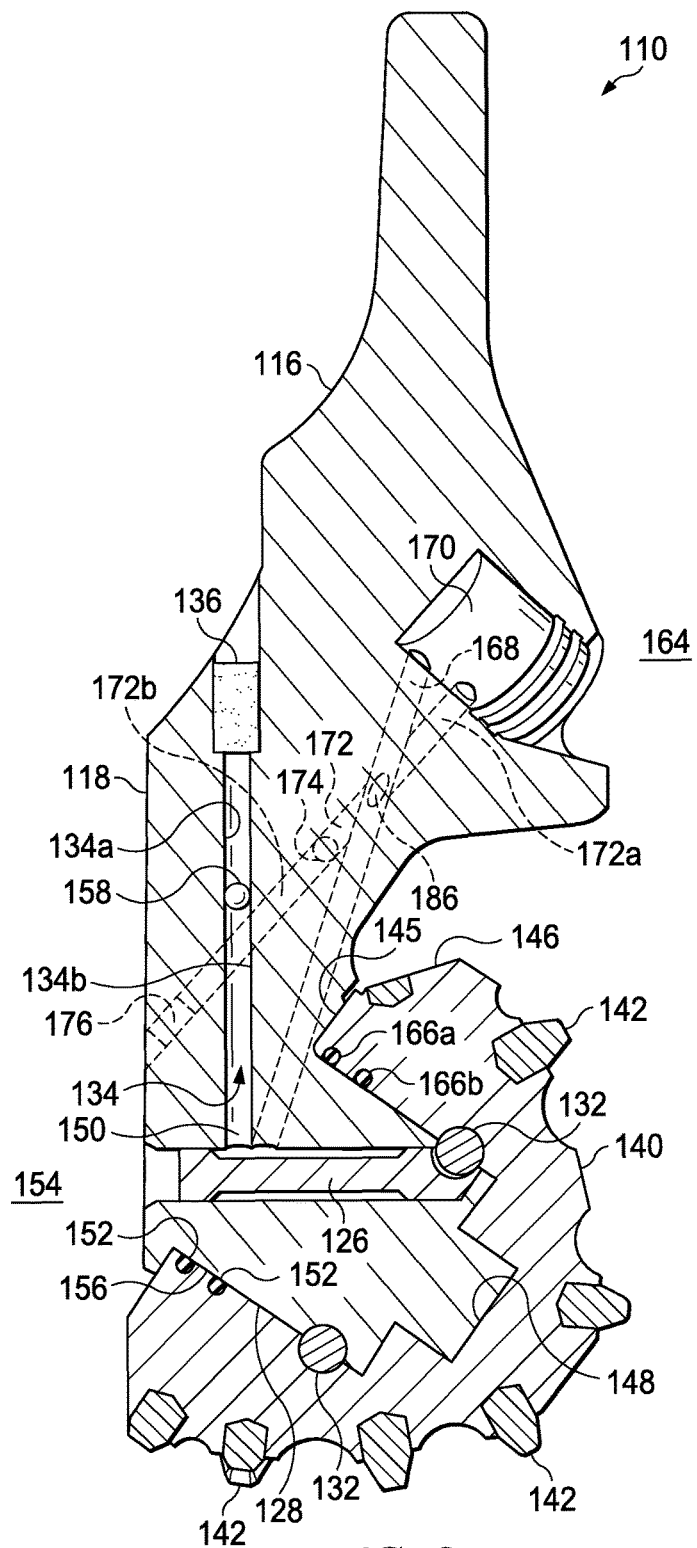
FIG. 8 illustrates a schematic drawing in section with portions broken away showing various components of a roller cone drill bit and an associated lubrication system incorporating a longhole, in accordance with embodiments of the present disclosure.

FIG. 8 illustrates a schematic drawing in section with portions broken away showing various components of roller cone drill bit 110 and an associated lubrication system incorporating longhole 168. In the present embodiment, longhole 168 may be a bore that connects lubricant reservoir 170 and lubricant chamber 150 via opening 186. Opening 186 maybe formed by the intersection of bore 172 and longhole 168, which may be disposed on different planes. Opening 186 may be similar to opening 178 as described with respect to FIGS. 4-6. However, because longhole 168 does not intersect bore 134, the complexities of an intersection of two bores, both containing a floating bead, may be avoided.

Depending on the pressure in lubricant chamber 170, floating bead 174 may move within bore 172 to either allow or prevent the movement of intergland grease through opening 186 in much the same way as floating bead 174 moves within bore 172 to allow or prevent movement of intergland grease through opening 178 in the embodiments shown in FIGS. 4-6.

Although shown as an ellipse, intersection 186 may be an opening of any shape, such as, square, rectangular, circular, and/or any other suitable shape. Intersection 186 may be sized such that floating bead 174 may not pass through intersection 186. For example, floating bead 174 may be larger than intersection 186 or floating bead 174 may be shaped in order to restrict floating bead 174 from entering bore 168 via intersection 186.

In certain embodiments of the present disclosure, intersection 186 may be located such that there may be a clearance between lubricant reservoir 170 and intersection 186. In other embodiments, there may not be clearance between lubricant reservoir 170 and intersection 186 such that floating bead 172 may not completely pass intersection 178 before contacting lubricant reservoir 170.

Figure 9:
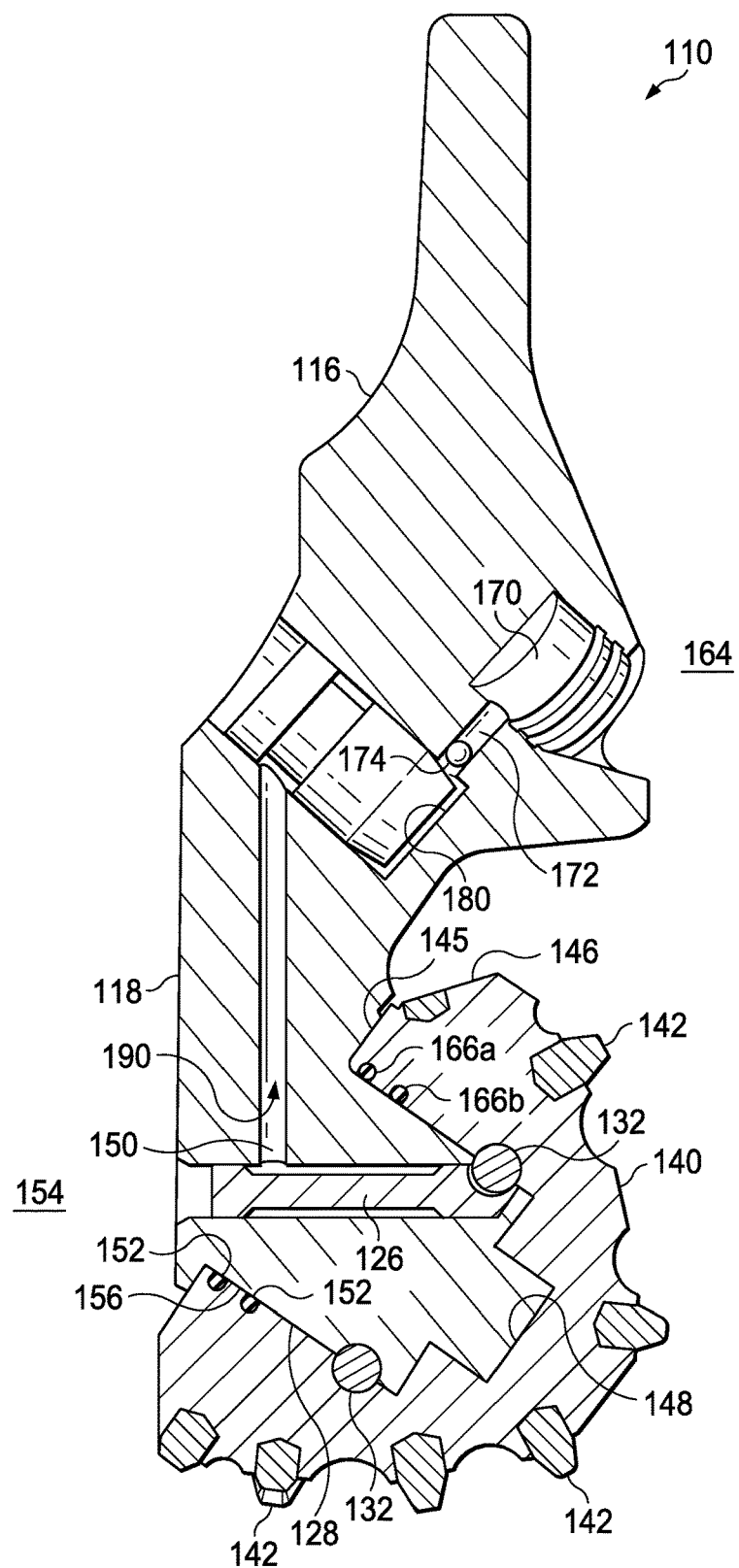
FIG. 9 illustrates a schematic drawing in section with portions broken away showing various components of a roller cone drill bit and an associated lubrication system incorporating two lubricant reservoirs, in accordance with some embodiments of the present disclosure.

FIG. 9 illustrates a schematic drawing in section with portions broken away showing various components of roller cone drill bit 110 and an associated intergland grease system incorporating two lubricant reservoirs 170 and 180, in accordance with some embodiments of the present disclosure. Drill bit 110 illustrated in FIG. 9 may be larger than drill bit 110 shown in FIGS. 4-8, e.g., larger than a 112.5" drill bit. Accordingly, the present embodiment may include two lubricant reservoirs 170 and 180. Lubricant reservoir 170 may be connected via bore 172 to lubricant reservoir 180. Floating bead 174 may be configured to move in bore 172 such that the pressure in lubricant reservoirs 170 and 180 remains substantially equalized. When floating bead 174 is at the end of bore 172 near lubricant reservoir 180, intergland grease may pass from lubricant reservoir 170 into lubricant reservoir 180. It may then pass through longhole 190 to reach lubricant chamber 150. Floating bead 174 may be configured and made of a material adequate to allow passage of fluid around floating bead 174 into the lubricant chamber 180.

EXAMPLES

The present disclosure may be better understood through reference to the following examples, which are illustrative only and should not be interpreted to encompass the entire breadth of the invention.

Example 1: Test Parameters

A rotary seal tester was equipped with a square gland, a seal test journal and an O-ring formed from hydrogenated nitrile butadiene rubber (HNBR). Various greases were tested for a maximum of 150 hours at 350 rpm, 30 psi.

Example 2: Test Greases

Test greases are presented in Table 1.

TABLE 1

Test Greases

| Designation | Base Grease | Additive |
|---|---|---|
| EG-1 | Calcium complex | $MoS_2$ |
| EG-2 | Calcium sulfonate* | None |
| EG-3 | Calcium sulfonate* | 10 wt % PTFE |
| EG-4 | Calcium sulfonate* | 10 wt % polybutene |

Example 3: Test Results

Figure 10:
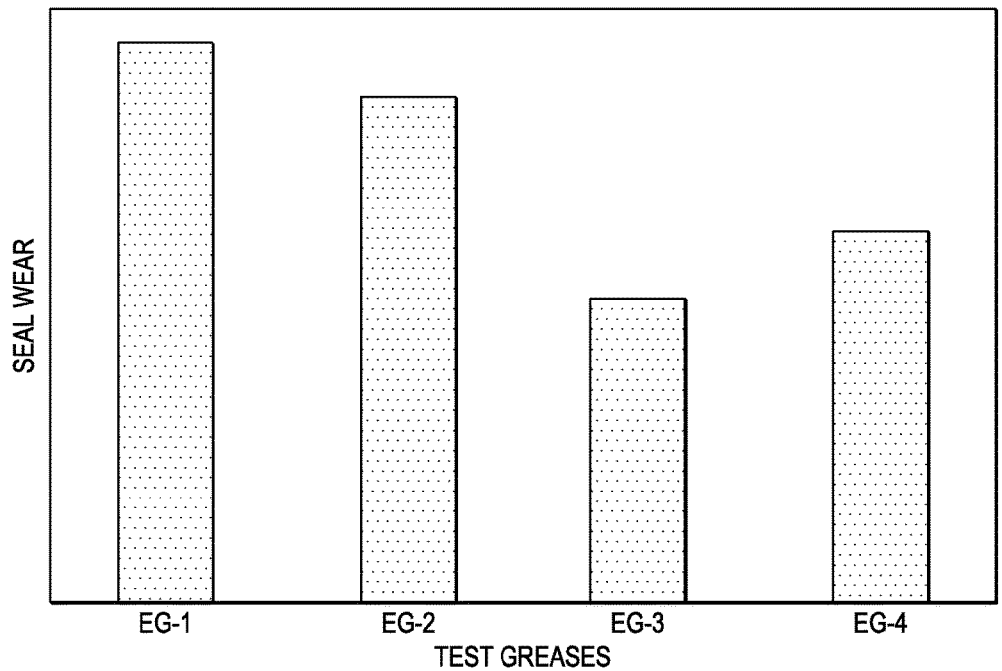
FIG. 10 presents the average radial seal diameter loss in a rotary seal tester for a variety of greases.
Figure 11:
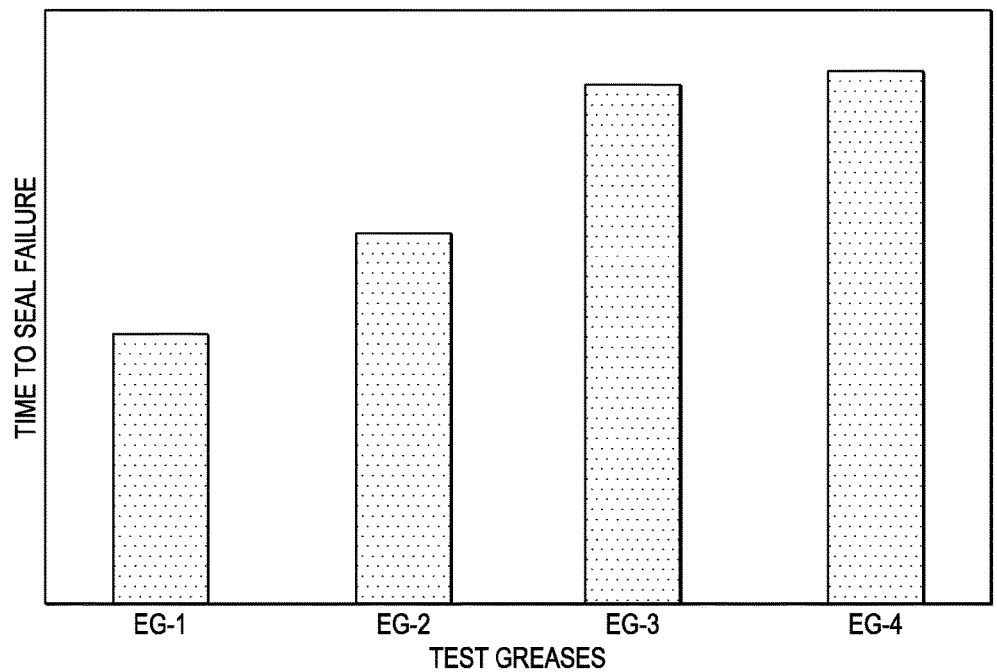
FIG. 11 presents the average time until seal failure in a rotary seal tester for a variety of greases.

Results of the rotary seal tester experiments are presented in FIGS. 10-11. FIG. 10 presents the average radial seal diameter loss. EG-4 demonstrated loss comparable to that of base grease EG-2 and EG-3 demonstrated significant loss improvements as compared to EG-2. Both EG-3 and EG-4 performed better than bearing grease EG-1. EG-4 resulted in 30% less seal diameter loss than EG-1.

FIG. 11 presents the average test duration before seal failure. EG-3 and EG-4 test grease increase time to seal failure by approximately two fold as compared to the EG-2 base grease alone. Both also performed markedly better than bearing grease, EG-1. EG-4 resulted in a 96% increase in hours until seal failure as compared to EG-1.

Although the present disclosure and its advantages have been described in detail, it should be understood that various changes, substitutions and alternations can be made herein without departing from the spirit and scope of the disclosure as defined by the following claims.

The invention claimed is:

1. A roller cone drill bit comprising:
    a bit body having at least one support arm extending therefrom;
    a cone assembly containing bearings or retaining balls and rotatably mounted on a journal extending from each support arm;
    at least two seals disposed in grooves formed in the cone assembly and each preventing debris and well fluids from entering an annular gap formed radially between the cone assembly and the journal;
    a lubricant chamber disposed in each support arm and fluidly coupled to at least one seal;
    a floating bead defining an exterior section and an interior section of a bore and in sealing engagement with the bore such that the exterior section and interior section of the bore are not in fluid communication; and
    an intergland grease disposed at least in an annular gap between the seals, wherein the intergland grease comprises a base grease and a lubricating intergland grease additive, but comprises no extreme pressure additive, and wherein the interior section of the bore is included as part of the lubricant chamber.

2. The drill bit of claim 1, wherein the intergland grease additive comprises polytetrafluoroethylene (PTFE).

3. The drill bit of claim 2, wherein the PTFE comprises PTFE particles.

4. The drill bit of claim 1, wherein the intergland grease additive comprise a lubricating liquid polymer.

5. The drill bit of claim 4, wherein the lubricating liquid polymer comprises polybutene.

6. The drill bit of claim 1, wherein the intergland grease comprises 10 wt % or less intergland grease additive.

7. The drill bit of claim 1, wherein the intergland grease comprises no molybdenum disulfide.

8. The drill bit of claim 1, wherein the base grease comprises a calcium sulfonate grease.

9. The drill bit of claim 1, wherein at least one of the at least two seals comprises a hydrogenated nitrile.

10. A roller cone drill bit comprising:
    a bit body having at least one support arm extending therefrom;
    a cone assembly containing bearings or retaining balls and rotatably mounted on a journal extending from each support arm;
    a lubricant reservoir disposed in each support arm;
    a lubricant chamber disposed in each support arm and fluidly coupled to the bearings or retaining balls;
    a first bore disposed in each support arm to communicate an intergland grease between the lubricant reservoir and the lubricant chamber, the intergland grease comprising a base grease and a lubricating intergland grease additive, but no extreme pressure additive;
    at least two seals disposed in grooves formed in the cone assembly and in contact with the intergland grease;
    a pressure release mechanism disposed within the first bore, the pressure release mechanism operable to relieve intergland grease from the lubricant reservoir into the lubricant chamber when lubricant pressure within the lubricant reservoir exceeds pressure of the intergland grease in the lubricant chamber; and
    a floating bead defining an exterior section and an interior section of a second bore and in sealing engagement with the second bore such that the exterior section and interior section of the second bore are not in fluid communication,
    wherein the interior section of the second bore is included as part of the lubricant chamber.

11. The drill bit of claim 10, wherein the intergland grease additive comprises polytetrafluoroethylene (PTFE).

12. The drill bit of claim 11, wherein the PTFE comprises PTFE particles.

13. The drill bit of claim 10, wherein the intergland grease additive comprise a lubricating liquid polymer.

14. The drill bit of claim 13, wherein the lubricating liquid polymer comprises polybutene.

15. The drill bit of claim 10, wherein the intergland grease comprises 10 wt % or less intergland grease additive.

16. The drill bit of claim 10, wherein the intergland grease comprises no molybdenum disulfide.

17. The drill bit of claim 10, wherein the base grease comprises a calcium sulfonate grease.

18. The drill bit of claim 10, wherein at least one of the at least two seals comprises a hydrogenated nitrile.

* * * * *